United States Patent
Passeri

[11] 3,789,655
[45] Feb. 5, 1974

[54] FLUID ANALYZER
[75] Inventor: David P. Passeri, Davenport, Iowa
[73] Assignee: The Bendix Corporation, South Bend, Ind.
[22] Filed: Mar. 20, 1972
[21] Appl. No.: 236,279

[52] U.S. Cl. .................................................. 73/24
[51] Int. Cl. ............................................ G01n 29/02
[58] Field of Search ........................................ 73/24

[56] References Cited
UNITED STATES PATENTS
3,557,605  1/1971  Lanneau et al. ........................ 73/24
3,353,400  11/1967  Schafft .................................... 73/24

Primary Examiner—Richard C. Queisser
Assistant Examiner—Arthur E. Korkosz
Attorney, Agent, or Firm—Leo H. McCormick, Jr.; William N. Antonis

[57] ABSTRACT

A rapid fluid analyzer for determining the percentage of a first fluid in a fluid mixture. A portion of the first fluid which is supplied to a mixing chamber is bled to a first chamber. The first fluid is also blended with a second fluid in the mixing chamber to form a fluid mixture. This fluid mixture is communicated to a storage chamber. A portion of the fluid mixture is bled to a second chamber. An identical energy wave is dispatched through the first fluid and the fluid mixture. A first receiver in the first chamber accepts the energy wave that passes through the first fluid. A second receiver in the second chamber accepts the energy wave that passes through the fluid mixture. The first receiver communicates a reference signal indicative of the accepted energy wave in the first fluid to an electronic detector. The second receiver likewise communicates a corresponding signal indicative of the accepted energy wave in the fluid mixture to the electronic detector. The electronic detector compares the corresponding signal with the reference signal to determine if a phase differential exists therebetween. The phase differential which is directly proportional to the percentage of the first fluid in the fluid mixture will permit instant monitoring by the analyzer.

1 Claim, 1 Drawing Figure

PATENTED FEB 5 1974 3,789,655
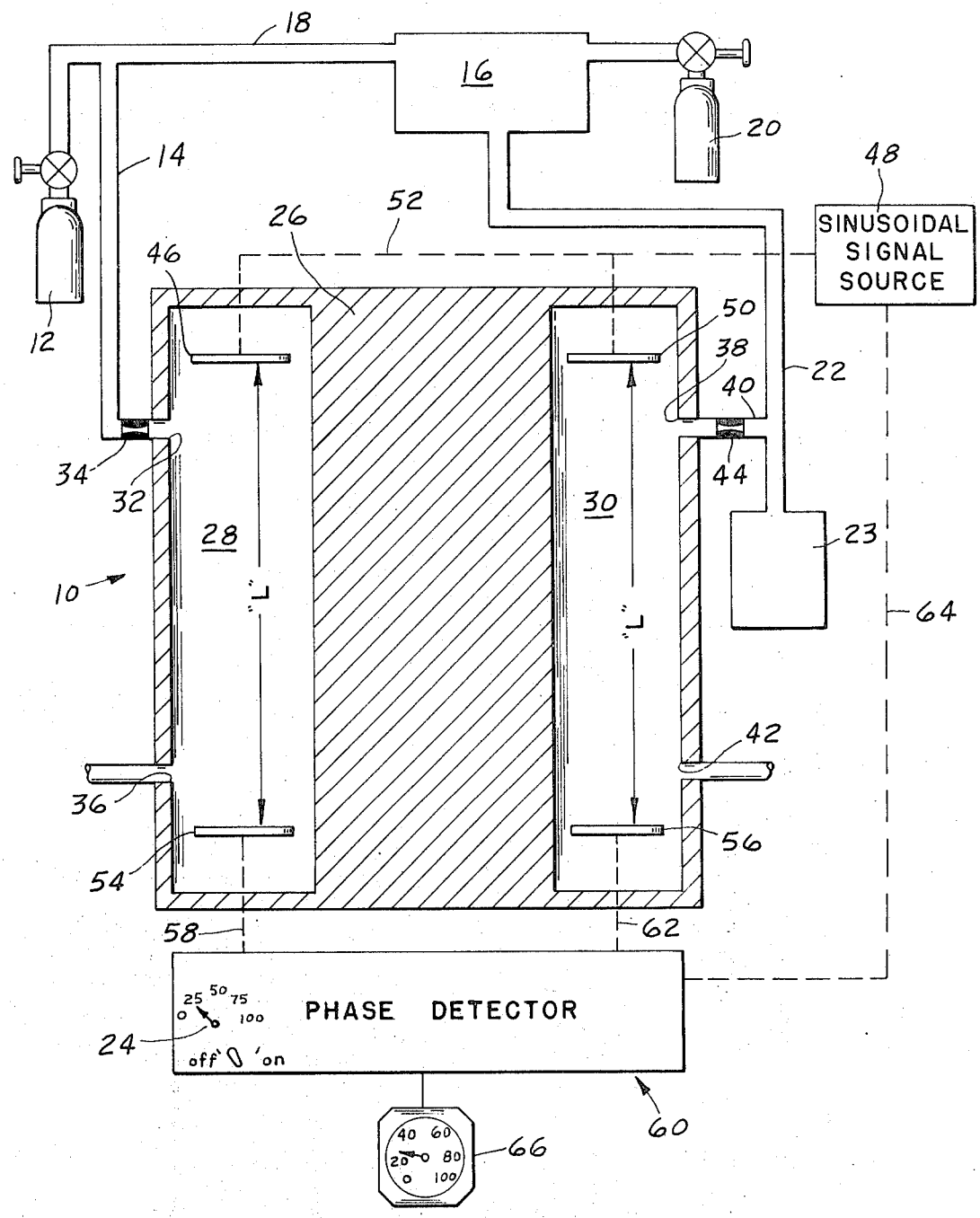

FLUID ANALYZER

BACKGROUND OF THE INVENTION

Determination of the percentage of one fluid in a mixture in general requires a laboratory wherein qualitative analysis can be performed.

Through experimentation it was later determined that each fluid mixture has an affinity for magnetic flux. U.S. Pat. No. 3,584,499 discloses a device wherein the magnetic susceptibility of a fluid mixture is compared with a reference fluid. This comparison will permit an electronic representation to be presented indicative of the percentage of the reference fluid in the mixture.

An alternative apparatus for analyzing a fluid mixture through a pair of pressure responsive diaphragms is disclosed in U.S. Pat. No. 3,534,753. An operational pressure signal will be derived by comparing a fluid pressure with a reference pressure to maintain a set ratio of fluids in the mixture.

SUMMARY OF THE INVENTION

I have devised a fluid analyzer wherein the percentage of a reference fluid in a fluid mixture is continually monitered. The reference fluid is freely bled through a first chamber and the fluid mixture freely bled through a second chamber. An energy frequency wave is produced and sent through the reference fluid in the first chamber and the fluid mixture in the second chamber. The energy frequency wave passing through the reference fluid and the fluid mixture is accepted by an electronic frequency detector. The detector compares the energy frequency wave in the reference fluid with that in the fluid mixture to determine any phase differential therebetween. The phase differential is a direct measurement of the percentage of the reference fluid in the fluid mixture.

BRIEF DESCRIPTION OF THE DRAWINGS

The drawing shows a sectional view of a fluid analyzer located in a system for supplying a fluid mixture to a storage chamber.

DETAILED DESCRIPTION OF THE PREFERRED EMBODIMENT

In the drawing a fluid analyzer 10 is shown connected to a reference fluid source 12 by conduit 14. The reference fluid source is transmitted to a mixing chamber 16 by conduit 18 for blending with a second fluid source 20. A controlled homogeneous fluid mixture will flow through conduit 22 to a storage chamber 23. The fluid analyzer 10 will control the blending of the fluid mixture in a manner fully described in copending U.S. application Ser. No. 236,280, incorporated herein by reference, to maintain a preselected percentage of the reference fluid in the fluid mixture as set on selector 24.

The fluid analyzer 10 has a housing 26 with a first chamber 28 and a second chamber 30 located therein. The first chamber 28 has a first inlet port 32 connected to the conduit 14 and an outlet port 36 opened to the atmosphere. The reference fluid under pressure can freely bleed past jewel 34 into chamber 28 and escape through outlet port 36 to the atmosphere providing an instantaneous reference flow corresponding to the flow into the mixing chamber 16. The second chamber 30 has a second inlet port 38 connected to conduit 22 carrying the fluid mixture by conduit 40 and a second outlet port 42 opened to the atmosphere. The fluid mixture under pressure can freely bleed past jewel 44 into the second chamber 30 and escape through outlet port 42 to the atmosphere for providing an instantaneous indication of the fluid mixture flowing into a storage chamber 23.

A first bimorph transmitting transducer 46 located in the first chamber 28 and a second bimorph transmitting transducer 50 located in the second chamber 30 are connected by lead 52 to an electronic oscillator 48. The electronic oscillator 48 generates a sinusoidal electrical signal to drive the first and second bimorph transducer. The driven first and second bimorph transducers will transmit an identical energy frequency signal which is sent or dispatched through the reference fluid in the first chamber 28 and the fluid mixture in the second chamber 30. The wavelength of the energy frequency signal dispatched from the first and second bimorph transducers, 46 and 50, respectively, is dependent on the frequency signal from the electronic oscillator 48, pressure of the reference fluid and fluid mixture, specific heat and density of the reference fluid and fluid mixture. The wavelength can be mathematically expressed through the following formula:

$$\lambda = (1/f)(\gamma P/D)^{1/2}$$

where
$\lambda$ is the wavelength
$\gamma$ the ratio of specific heats
$P$ the pressure
$D$ the gas density
$f$ frequency of the signal source A first bimorph receiving transducer 54 is located in the first chamber 28 a distance "L" from the first bimorph transmitting transducer 48. The distance "L" is chosen as some multiple of the calculated wavelength of the energy frequency signal in the reference fluid. A second bimorph receiving transducer 56 is located in the second chamber 30 the same chosen distance "L" from the second bimorph transmitting transducer 50.

The first bimorph receiving transducer 54 is connected by lead 58 to an electronic detector means 60. The second bimorph receiving transducer 56 is connected to the electronic detector means 60 by lead 62.

The first bimorph receiving transducer 54 accepts the energy frequency signal that passes through the reference fluid and relays a reference signal indicative thereof to the electronic detector means 60. The second receiving transducer 56 accepts the energy frequency signal that passes through the fluid mixture and relays a corresponding signal thereof to the electronic detector means 60. The electronic detector means 60 upon receiving the reference signal from the first receiving transducer 54 and the corresponding signal from the second receiving transducer 56 will determine any phase differential therebetween in relationship to the operational sinusoidal signal communicated through leads 64, the phase differential being in a direct relationship with the percentage of the reference fluid in the fluid mixture. This phase differential is being connected into an operational signal for visually displaying the measured percentage of reference fluid in the fluid mixture on dial 66. The operational signal, as disclosed in the above incorporated U.S. application Ser. No. 236,280, additionally controls the flow of the reference fluid and the fluid mixture to constantly provide a homogeneous preselected mixture to the storage chamber 23.

I claim:

1. A fluid analyzer means for continually monitoring the percentage of a first fluid in a flowing fluid mixture, said analyzer means comprising:

a housing having a first chamber and a second chamber therein, said first chamber having a first inlet port in communication with said first fluid and a first outlet port in communication with the atmosphere to permit the first fluid to freely flow thereto upon passing through a first jewel control in the first inlet port, said first jewel regulating the flow of the first fluid into the first chamber, said second chamber having a second inlet port in communication with a chamber where said first fluid and a second fluid are combined into a fluid mixture and a second outlet port in communication with the atmosphere to permit the fluid mixture to freely flow thereto upon passing through a second jewel control in the second inlet port, said second jewel regulating the flow of the fluid mixture into the second chamber;

signal sending means located in said first and second chambers for transferring an identical sound wave through said first fluid and said fluid mixture, said sending means having a first bimorph transmitting transducer located in the first chamber for dispatching sound waves through said first fluid, said sending means having a second bimorph transmitting transducer located in the second chamber for dispatching said sound waves through said fluid mixture, said first and second bimorph transmitting transducers being simultaneously driven by a sinusoidal electrical signal from an electronic oscillator to produce said identical sound waves;

a first bimorph receiving transducer located in said first chamber a first predetermined distance from said first bimorph transmitting transducer for accepting said dispatched sound waves passing through said first fluid, said first bimorph receiving transducer converting said sound waves into a reference signal indicative of the first fluid;

a second bimorph receiving transducer located in said second chamber a predetermined distance from said second bimorph transmitting transducer for accepting said dispatched sound waves passing through said fluid mixture, said second bimorph receiving transducer converting said sound wave into a test signal indicative of the fluid mixture;

electronic detector means connected to said first bimorph receiving transducer, said second bimorph receiving transducer, and said electronic oscillator for comparing a phase differential between said reference signal and the test signal in relation to the sinusoidal electrical signal, said phase differential being directly proportional to the percentage of said first fluid in the mixture; and indicator means responsive to said phase differential to give a visual indication of the percentage of said first fluid in the mixture.

* * * * *